(12) United States Patent
Li et al.

(10) Patent No.: US 11,975,985 B2
(45) Date of Patent: May 7, 2024

(54) FUNCTIONAL MATERIAL FOR SYNCHRONOUSLY STABILIZING MULTIPLE METALS AND PREPARATION METHOD THEREOF, AND METHOD FOR REHABILITATING SOIL OR WASTEWATER CONTAMINATED BY HEAVY METALS (METALLOIDS)

(71) Applicant: Central South University, Changsha (CN)

(72) Inventors: Qian Li, Changsha (CN); Rui Xu, Changsha (CN); Shengming Jin, Changsha (CN); Tao Jiang, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 122 days.

(21) Appl. No.: 17/728,958

(22) Filed: Apr. 25, 2022

(65) Prior Publication Data

US 2023/0219055 A1    Jul. 13, 2023

(30) Foreign Application Priority Data

Jan. 11, 2022 (CN) .......................... 202210028331.0

(51) Int. Cl.
*C01G 49/00* (2006.01)
*B01J 20/02* (2006.01)
(Continued)

(52) U.S. Cl.
CPC ...... *C01G 49/0072* (2013.01); *B01J 20/0222* (2013.01); *B01J 20/0229* (2013.01);
(Continued)

(58) Field of Classification Search
None
See application file for complete search history.

(56) References Cited

U.S. PATENT DOCUMENTS

2020/0123073 A1* 4/2020 Al .......................... C05F 3/00

FOREIGN PATENT DOCUMENTS

CN        105478074 A  *  4/2016  ............ B01J 20/045

OTHER PUBLICATIONS

Xu et al. (Journal of Hazardous Materials, 2022, 438, 129481). (Year: 2022).*

(Continued)

*Primary Examiner* — Clare M Perrin
(74) *Attorney, Agent, or Firm* — Nevrivy Patent Law Group P.L.L.C.

(57) ABSTRACT

Disclosed are a functional material for synchronously stabilizing multiple metals and a preparation method thereof, and a method for rehabilitating soil or wastewater contaminated by heavy metals (metalloids). The preparation method includes: mixing a ferrous salt, a ferric salt, a manganous salt, water, a dispersing material, and a phosphate to obtain a first mixture, and subjecting the first mixture to a first precipitation reaction to obtain a first reaction mixture containing the phosphate; adjusting a pH value of the first reaction mixture containing the phosphate to 10-12 by adding an alkali thereto to obtain a second mixture, subjecting the second mixture to a second precipitation reaction to obtain a second reaction mixture; and subjecting the second reaction mixture to a solid-liquid separation to obtain a solid, washing the solid, and drying to obtain the functional material for synchronously stabilizing multiple metals.

19 Claims, 4 Drawing Sheets

(51) Int. Cl.
  *B01J 20/06*   (2006.01)
  *B01J 20/30*   (2006.01)
  *B09C 1/08*   (2006.01)
  *C02F 1/28*   (2023.01)
  *C02F 1/52*   (2023.01)
  *C02F 1/00*   (2023.01)
  *C02F 101/10*   (2006.01)
  *C02F 101/22*   (2006.01)

(52) U.S. Cl.
  CPC ........... *B01J 20/0292* (2013.01); *B01J 20/06* (2013.01); *B01J 20/3071* (2013.01); *B01J 20/3085* (2013.01); *B09C 1/08* (2013.01); *C02F 1/281* (2013.01); *C02F 1/5245* (2013.01); *C02F 2001/007* (2013.01); *C02F 2101/103* (2013.01); *C02F 2101/22* (2013.01); *C02F 2209/06* (2013.01)

(56)     References Cited

OTHER PUBLICATIONS

Jin et al. (Progress in Chemistry, 2014, 26(9), 1551-1561). (Year: 2014).*

Machine translation of CN-105478074-A, pp. 1-7. (Year: 2016).*

* cited by examiner

FUNCTIONAL MATERIAL FOR SYNCHRONOUSLY STABILIZING MULTIPLE METALS AND PREPARATION METHOD THEREOF, AND METHOD FOR REHABILITATING SOIL OR WASTEWATER CONTAMINATED BY HEAVY METALS (METALLOIDS)

CROSS REFERENCE TO RELATED APPLICATIONS

This patent application claims the benefit and priority of Chinese Patent Application No. 202210028331.0, entitled by "Functional material for synchronously stabilizing multiple metals and preparation method thereof, and method for rehabilitating soil or wastewater contaminated by heavy metals (metalloids)" filed on Jan. 11, 2022, the disclosure of which is incorporated by reference herein in its entirety as part of the present application.

FIELD OF THE INVENTION

The present disclosure relates to the technical field of heavy metal contamination treatment, in particular to a functional material for synchronously stabilizing multiple metals and a preparation method thereof, and a method for rehabilitating soil or wastewater contaminated by heavy metals (metalloids).

BACKGROUND ART

With the rapid development of industrial economy, soil environmental problems have become increasingly expressive. According to reports, there are about 10 million soil-contaminated sites in the world. Among them, heavy metals (metalloids)-contaminated soil site accounts for more than 50%, wherein more than 20 million hectares of lands have been contaminated by heavy metals (metalloids) such as cadmium (Cd), lead (Pb), copper (Cu), zinc (Zn), arsenic (As), antimony (Sb), chromium (Cr) and nickel (Ni). The heavy metals (metalloids) are highly toxic, difficult to degrade, and easily bioaccumulate in the food chain, posing a serious threat to human health and ecological environment security. Therefore, heavy metal (metalloid)-based contamination, especially soil contaminated by multiple heavy metals (metalloids), has become an environmental problem to be solved urgently.

Compared to other rehabilitation techniques, stabilization in situ has been proved to be an effective, simple and low-cost rehabilitation technique. At present, rehabilitation materials for stabilization commonly used in the market mainly include various types of clay minerals (such as bentonite and kaolinite), phosphorus-containing substances (such as phosphate rock powder and calcium phosphate), metal oxides and/or metal hydroxides (such as iron-based materials), organic materials (such as humic acid and organic fertilizers), siliceous materials (such as diatomite and fly ash), biochars (such as bone char and rice husk charcoal), and novel nanomaterials. However, most of these studies have focused on stabilization of individual toxic heavy metals (metalloids) in contaminated soil, while there is no report on synchronously stabilizing multiple heavy metals (metalloids) in the contaminated soil.

SUMMARY

In view of this, an object of the present disclosure is to provide a functional material for synchronously stabilizing multiple metals and a preparation method thereof, and a method for rehabilitating soil or wastewater contaminated by heavy metals (metalloids). In the present disclosure, the functional material for synchronously stabilizing multiple metals could stabilize multiple heavy metals (metalloids) synchronously, thereby effectively rehabilitating or purifying the soil or wastewater contaminated by multiple heavy metals (metalloids).

To achieve the above object, the present disclosure provides the following technical solutions.

The present disclosure provides a method for preparing a functional material for synchronously stabilizing multiple metals, including the following steps:

(1) mixing a ferrous salt, a ferric salt, a manganous salt, water, a dispersing material, and a phosphate to obtain a first mixture, and subjecting the first mixture to a first precipitation reaction to obtain a first reaction mixture containing the phosphate, wherein a sum of a molar amount of iron element in the ferrous salt and the ferric salt, and manganese element in the manganous salt is stoichiometrically excess relative to a molar amount of the phosphate;

(2) adjusting a pH value of the first reaction mixture containing the phosphate to 10-12 by adding an alkali thereto to obtain a second mixture, and subjecting the second mixture to a second precipitation reaction to obtain a second reaction mixture; and (3) subjecting the second reaction mixture to a solid-liquid separation to obtain a solid, washing the solid, and drying to obtain the functional material for synchronously stabilizing multiple metals.

In some embodiments, in step (1), mixing the ferrous salt, the ferric salt, the manganous salt, water, the dispersing material, and the phosphate includes the following steps:
mixing the ferrous salt, the ferric salt, the manganous salt, and water to obtain an aqueous salt solution;
adding the dispersing material to the aqueous salt solution and mixing to obtain a mixed dispersion; and
adding the phosphate to the mixed dispersion.

In some embodiments, in step (1), the ferrous salt is at least one selected from the group consisting of $FeSO_4$, $FeSO_4 \cdot 7H_2O$, $FeCl_2$, and $Fe(NH_4)_2(SO_4)_2 \cdot 6H_2O$; the ferric salt is at least one selected from the group consisting of $Fe_2(SO_4)_3 \cdot xH_2O$, $FeCl_3$, and $NH_4Fe(SO_4)_2$; the manganous salt is at least one selected from the group consisting of $MnSO_4$, $MnSO_4 H_2O$, and $MnCl_2 \cdot 6H_2O$; the phosphate is at least one selected from the group consisting of $NH_4H_2PO_4$, $(NH_4)_2HPO_4$, $NaH_2PO_4$, $Na_2HPO_4$, $KH_2PO_4$, and $K_2HPO_4$.

In some embodiments, in step (1), a ratio of a molar amount of $Fe^{2+}$ in the ferrous salt, $Fe^{3+}$ in the ferric salt and $Mn^{2+}$ in the manganous salt to a molar amount of $PO_4^{3-}$ in the phosphate is in the range of (1.4-13):1; a molar ratio of $Fe^{2+}$, $Fe^{3+}$ and $Mn^{2+}$ is in the range of (1-5):(1-5):(1-5).

In some embodiments, in step (1), the dispersing material is at least one selected from the group consisting of kaolin, rectorite, attapulgite, sepiolite, and white carbon black; a mass of the dispersing material is 10% to 25% of a sum of the masses of iron element in the ferrous salt and the ferric salt, and manganese element in the manganous salt.

In some embodiments, the first precipitation reaction and the second precipitation reaction each are independently conducted for 30 min to 120 min; both of the first precipitation reaction and the second precipitation reaction are conducted with stirring, each independently at a stirring speed of 200 r/min to 500 r/min.

In some embodiments, in step (3), the drying is conducted at a temperature of 60° C. to 450° C.

The present disclosure further provides a functional material for synchronously stabilizing multiple metals prepared by the method, including a phosphate compound, an iron-manganese oxide, and an iron-manganese hydroxide, wherein the functional material for synchronously stabilizing multiple metals has a pore diameter of 4 nm to 15 nm, a specific surface area of 110 $m^2/g$ to 190 $m^2/g$, and a total pore volume of 0.14 $cm^3/g$ to 0.44 $cm^3/g$.

The present disclosure further provides a method for rehabilitating soil or wastewater contaminated by heavy metals and/or metalloids, including the following steps:

mixing the soil or wastewater contaminated by heavy metals and/or metalloids with a rehabilitation material for stabilization, and conducting a rehabilitation, wherein the heavy metals and/or metalloids include at least one selected from the group consisting of Cd, Pb, Cu, Zn, Ni, Cr, As, and Sb; the rehabilitation material for stabilization is the functional material for synchronously stabilizing multiple metals.

In some embodiments, under the condition of rehabilitating the soil contaminated by heavy metals and/or metalloids, a mass of the rehabilitation material for stabilization is 0.1% to 3% of a mass of the soil, and the rehabilitation is conducted at a temperature of 10° C. to 40° C. for 10 days to 35 days; under the condition of rehabilitating the wastewater contaminated by heavy metals and/or metalloids, the rehabilitation material for stabilization is added in an amount of 0.2 g/L to 3 g/L to the wastewater, and the rehabilitation is conducted at a temperature of 10° C. to 40° C. for 3 h to 24 h.

The present disclosure provides a method for preparing a functional material for synchronously stabilizing multiple metals, including the following steps: (1) mixing a ferrous salt, a ferric salt, a manganous salt, water, a dispersing material, and a phosphate to obtain a first mixture, and subjecting the first mixture to a first precipitation reaction to obtain a first reaction mixture containing the phosphate, wherein a sum of a molar amount of iron element in the ferrous salt and the ferric salt, and manganese element in the manganous salt is stoichiometrically excess relative to a molar amount of the phosphate; (2) adjusting a pH value of the first reaction mixture containing the phosphate to 10-12 by adding an alkali thereto to obtain a second mixture, and subjecting the second mixture to a second precipitation reaction to obtain a second reaction mixture; (3) subjecting the second reaction mixture to a solid-liquid separation to obtain a solid, washing the solid, and drying to obtain the functional material for synchronously stabilizing multiple metals. The technical solutions according to the present disclosure has the following beneficial effects:

In the present disclosure, the functional material for stabilization is environmentally-friendly, loose and porous, and has a relatively larger specific surface area and abundant surface functional groups. The functional material includes a phosphate compound and an iron-manganese oxide and/or an iron-manganese hydroxide as main chemical components, and has stabilization properties of the phosphate compound and the iron-manganese oxide and/or the iron-manganese hydroxide to the metals (metalloids). Phosphate groups could form strong complexes or precipitates with heavy metal cations, and hydroxyl groups on a surface of the iron-manganese oxide and/or the iron-manganese hydroxide have good affinity for oxygen-containing ions such as As, Sb and Cr ions, thereby forming stable complexes. Therefore, the functional material for stabilization could stabilize multiple heavy metals (metalloids) (Cd, Pb, Cu, Zn, Ni, Cr, As, and Sb) synchronously, thereby effectively rehabilitating or purifying the soil or wastewater contaminated by multiple heavy metals (metalloids). The added dispersing material could effectively prevent agglomeration of the iron-manganese oxide and/or iron-manganese hydroxide, and could increase negative charges on a surface of the functional material to promote adsorption of heavy metal cations by the functional material. Further, adding the dispersing material before precipitation reaction makes the iron ions in the ferrous salt and the ferric salt and manganese ions in the manganous salt evenly dispersed, which could more effectively prevent particles from agglomerating, to further improve the adsorption efficiency of heavy metals by the functional material.

In the preparation method according to the present disclosure, a ratio of the ferrous salt, the ferric salt and the manganous salt could be adjusted, such that the prepared functional material for stabilization could efficiently rehabilitate the soil or wastewater with different types of pollution.

The preparation method has simple operations, mild conditions, readily available raw materials, low cost, good repeatability, and wide adaptability, and could be used for large-scale production and application; moreover, mother liquors generated during the preparation could be recycled to reduce the discharge of nitrogen- and phosphorus-containing wastewater, thereby further reducing the cost for preparing the functional material.

DETAILED DESCRIPTION OF THE EMBODIMENTS

The present disclosure provides a method for preparing a functional material for synchronously stabilizing multiple metals, including the following steps:

(1) mixing a ferrous salt, a ferric salt, a manganous salt, water, a dispersing material, and a phosphate to obtain a first mixture, and subjecting the first mixture to a first precipitation reaction to obtain a first reaction mixture containing the phosphate, wherein a sum of a molar amount of iron element in the ferrous salt and the ferric salt, and manganese element in the manganous salt is stoichiometrically excess relative to a molar amount of the phosphate;

(2) adjusting a pH value of the first reaction mixture containing the phosphate to 10-12 by adding an alkali thereto to obtain a second mixture, and subjecting the second mixture to a second precipitation reaction to obtain a second reaction mixture; and (3) subjecting the second reaction mixture to a solid-liquid separation to obtain a solid, washing the solid, and drying to obtain the functional material for synchronously stabilizing multiple metals.

Figure 1:
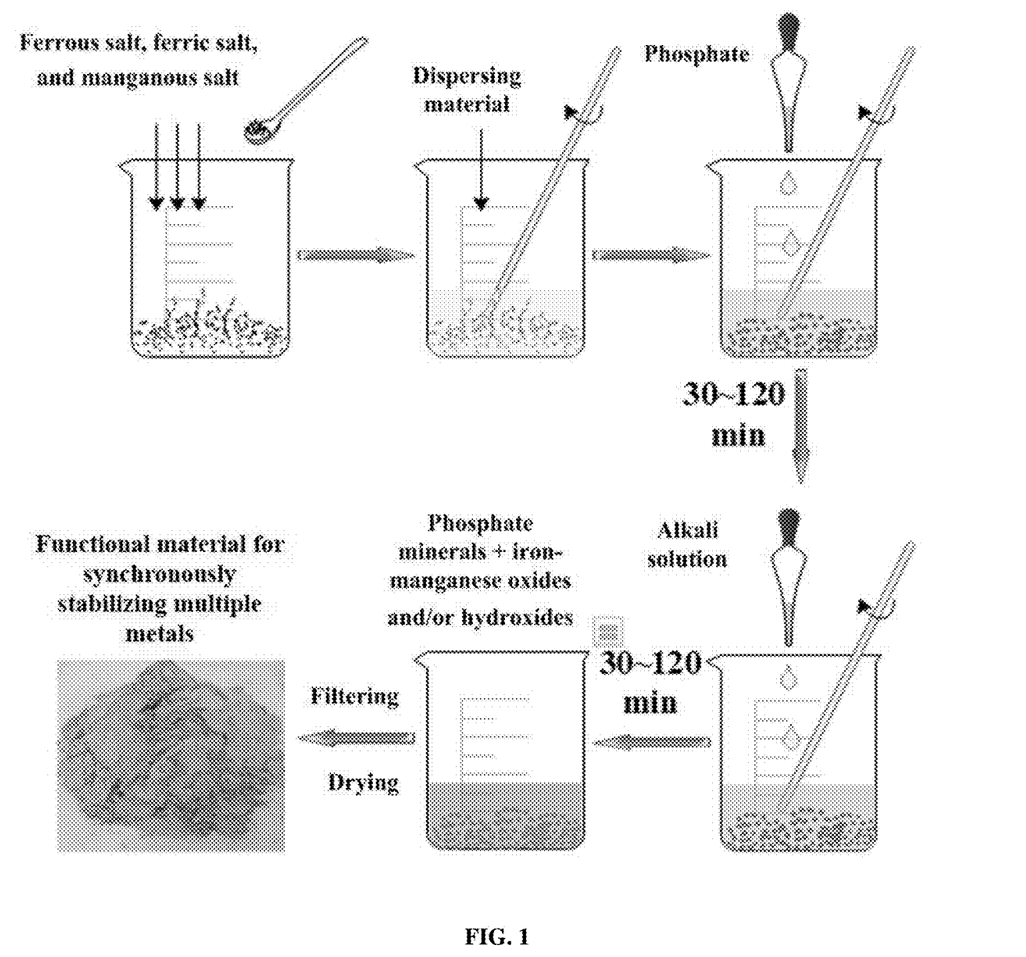
FIG. 1 shows a flow diagram of a method for preparing a functional material for synchronously stabilizing multiple metals according to one embodiment of the present disclosure.

FIG. 1 shows a flow diagram of a method for preparing the functional material for synchronously stabilizing multiple metals according to one embodiment of the present disclosure.

In the present disclosure, the ferrous salt, the ferric salt, the manganous salt, water, the dispersing material, and the phosphate are mixed to obtain a first mixture, and the first mixture is subjected to a first precipitation reaction to obtain the first reaction mixture containing the phosphate. In some embodiments, the ferrous salt is at least one selected from the group consisting of $FeSO_4$, $FeSO_4 \cdot 7H_2O$, $FeCl_2$, and $Fe(NH_4)_2(SO_4)_2 \cdot 6H_2O$. In some embodiments, the ferric salt is at least one selected from the group consisting of $Fe_2(SO_4)_3 \cdot xH_2O$ (ferric sulfate), $FeCl_3$, and $NH_4Fe(SO_4)_2$. In some embodiments, the manganous salt is at least one selected from the group consisting of $MnSO_4$, $MnSO_4 \cdot H_2O$, and $MnCl_2 \cdot 6H_2O$. In some embodiments, the phosphate is at least one selected from the group consisting of $NH_4H_2PO_4$, $(NH_4)_2HPO_4$, $NaH_2PO_4$, $Na_2HPO_4$, $KH_2PO_4$, and $K_2HPO_4$. In some embodiments, the phosphate is added in the form of a phosphate solution. A sum of a molar amount of iron element in the ferrous salt and the ferric salt, and manganese element in the manganous salt is stoichiometrically excess relative to a molar amount of the phosphate. In some embodiments, a ratio of a molar amount of $Fe^{2+}$ in the ferrous salt, $Fe^{3+}$ in the ferric salt and $Mn^{2+}$ in the manganous salt to a molar amount of $PO_4^{3-}$ in the phosphate is in the range of (1.4-13):1. In some embodiments, a molar ratio of $Fe^{2+}$, $Fe^{3+}$ and $Mn^{2+}$ is in the range of (1-5):(1-5):(1-5). In some examples, a molar ratio of $Fe^{2+}$ in the ferrous salt, $Fe^{3+}$ in the ferric salt, $Mn^{2+}$ in the manganous salt, and $PO_4^{3-}$ in the phosphate is 1:3:3:3, 1:5:5:5, 3:1:3:5, 3:3:5:1, 1:1:1:1, 3:5:1:3, 5:1:5:3, 5:3:1:5, or 5:5:3:1. In the preparation method according to the present disclosure, a ratio of the ferrous salt, the ferric salt and the manganous salt could be adjusted, such that the prepared functional material for stabilization could efficiently rehabilitate the soil or wastewater with different types of pollution. Specifically, an increased proportion of $PO_4^{3-}$ results in a high proportion of the phosphate compound in the obtained product. The phosphate compound tend to stabilize Cd, Pb, Cu, Zn, Ni, and Cr, and could be used for the rehabilitation of contaminated soil or wastewater with high Cd, Pb, Cu, Zn, Ni, and Cr contents. An increased proportion of $Fe^{2+}$, $Fe^{3+}$, and $Mn^{2+}$ results in a high proportion of the iron-manganese oxide and/or the iron-manganese hydroxide in the obtained product. The iron-manganese oxide and/or iron-manganese hydroxide tend to stabilize As and Sb, and could be used for the rehabilitation of contaminated soil or wastewater with high As and Sb contents.

In some embodiments of the present disclosure, the dispersing material is at least one selected from the group consisting of kaolin, rectorite, attapulgite, sepiolite, and white carbon black. In some embodiments, the dispersing material has a micro-scale or nano-scale particle size. In some embodiments, the dispersing material is a natural mineral with a wide range of sources, which is cheap, readily available, and environmentally-friendly, and has good dispersibility and chemical stability. In some embodiments, a mass of the dispersing material is 10% to 25%, preferably 15% to 25% of a sum of the masses of iron element in the ferrous salt and the ferric salt, and manganese element in the manganous salt. The dispersing material could effectively prevent agglomeration of the iron-manganese oxide and/or iron-manganese hydroxide, and could increase negative charges on a surface of the functional material to promote adsorption of heavy metal cations by the functional material.

In some embodiments of the present disclosure, mixing the ferrous salt, the ferric salt, the manganous salt, water, the dispersing material, and the phosphate includes the following steps: mixing the ferrous salt, the ferric salt, the manganous salt, and water to obtain an aqueous salt solution; adding the dispersing material to the aqueous salt solution, and mixing to obtain a mixed dispersion; and adding the phosphate to the mixed dispersion. There is no special requirement for an amount of water, as long as the ferrous salt, the ferric salt, the manganous salt could be fully dissolved. Adding the dispersing material before the first precipitation reaction makes the iron ions in the ferrous salt and the ferric salt and and manganese ions in the manganous salt evenly dispersed, which could more effectively prevent particles from agglomerating, to further improve the stabilization efficiency of heavy metals by the functional material. In some embodiments, the first precipitation reaction is conducted at room temperature of 25° C. In some embodiments, the first precipitation reaction is conducted for 30 min to 120 min, more preferably 45 min to 120 min. In some embodiments, the first precipitation reaction is conducted with stirring. In some embodiments, the first precipitation reaction is conducted at a stirring speed of 200 r/min to 500 r/min, preferably 300 r/min to 400 r/min. During the first precipitation reaction, the ferrous salt, the ferric salt and the manganous salt are reacted with the phosphate to generate fine phosphate compound particles, respectively, to obtain the first reaction mixture containing the phosphate; the first reaction mixture further includes excess $Fe^{2+}$, $Fe^{3+}$ or $Mn^{2+}$.

In the present disclosure, a pH value of the first reaction mixture containing the phosphate is adjusted to 10-12 by adding an alkali thereto to obtain a second mixture, and the second mixture is subjected to a second precipitation reaction to obtain a second reaction mixture. In some embodiments, the alkali includes at least one selected from the group consisting of ammonia water, NaOH, and KOH. In some embodiments, the NaOH and the KOH are added in the form of a NaOH solution and a KOH solution. In some embodiments, the second precipitation reaction is conducted at room temperature. In some embodiments, the second precipitation reaction is conducted for 30 min to 120 min, preferably 45 min to 120 min In some embodiments, the second precipitation reaction is conducted with stirring. In some embodiments, the second precipitation reaction is conducted at 200 r/min to 500 r/min, preferably 300 r/min to 400 r/min. During the second precipitation reaction, the excess $Fe^{2+}$, $Fe^{3+}$ or $Mn^{2+}$ in the first reaction mixture are completely converted to corresponding hydroxides and is precipitated.

In the present disclosure, after obtaining the second reaction mixture, the second reaction mixture is subjected to a solid-liquid separation to obtain a solid, and the solid is washed and dried to obtain the functional material for synchronously stabilizing multiple metals. In the present disclosure, there is no special requirement for the means for the solid-liquid separation, and means for the solid-liquid separation well known to those skilled in the art may be used, such as a filtration. In the present disclosure, a mother liquor obtained from the solid-liquid separation could be recycled, and specifically could be used as a raw material for preparing the alkali for pH adjustment in the second precipitation reaction. Recycling the mother liquor could reduce the discharge of nitrogen- and phosphorus-containing wastewater, and further reduce the preparation cost of the functional material. In some embodiments, the solid is washed with pure water. In some embodiments, the drying is conducted at a temperature of 60° C. to 450° C., preferably 100° C. to 450° C. There is no special requirement for a drying time, as long as the solid is dried to a constant weight. During the drying, part of the iron hydroxide(s) and manganese hydroxide(s) could be dehydrated into iron oxide(s) or manganese oxide(s); while part of divalent iron is oxidized to ferric iron, and divalent manganese is oxidized to manganese with a higher valence state.

The present disclosure further provides a functional material for synchronously stabilizing multiple metals prepared by the method, including a phosphate compound, an iron-manganese oxide, and an iron-manganese hydroxide, wherein the functional material for synchronously stabilizing multiple metals has a pore diameter of 4 nm to 15 nm, a specific surface area of 110 m$^2$/g to 190 m$^2$/g, and a total pore volume of 0.14 cm$^3$/g to 0.44 cm$^3$/g. In the present disclosure, the functional material for stabilization is environmentally-friendly, loose and porous on the surface, and has a relatively larger specific surface area and abundant surface functional groups. The functional material includes the phosphate compound and the iron-manganese oxide and/or iron-manganese hydroxide as main chemical components, and exhibits stabilization properties of the phosphate compound and the iron-manganese oxide and/or iron-manganese hydroxide to the metals and/or metalloids. Phosphate groups could form strong complexes or precipitates with heavy metal cations, and hydroxyl groups on a surface of the iron-manganese oxide and/or iron-manganese hydroxide have good affinity for oxygen-containing ions such as As, Sb and Cr ions, thereby forming stable complexes. Therefore, the functional material for stabilization could immobilize a single heavy metal (metalloid), to effectively rehabilitate or purify the soil or wastewater contaminated by a single heavy metal (metalloid); meanwhile, the functional material could further effectively immobilize multiple metals and/or metalloids synchronously, to effectively rehabilitate or purify the soil or wastewater contaminated by multiple metals and/or metalloids.

The present disclosure further provides a method for rehabilitating soil or wastewater contaminated by heavy metals and/or metalloids, including the following steps:

mixing the soil or wastewater contaminated by heavy metals and/or metalloids with a rehabilitation material for stabilization, and conducting a rehabilitation, wherein the heavy metals and/or metalloids include at least one selected from the group consisting of Cd, Pb, Cu, Zn, Ni, Cr, As, and Sb, and the rehabilitation material for stabilization is the functional material for synchronously stabilizing multiple metals.

In some embodiments of the present disclosure, under the condition of rehabilitating the soil contaminated by heavy metals and/or metalloids, a mass of the rehabilitation material for stabilization is 0.1% to 3% of a mass of the soil; in some embodiments, the rehabilitation is conducted at a temperature of 10° C. to 40° C. for 10 days to 35 days. In some embodiments, under the condition of rehabilitating the wastewater contaminated by heavy metals and/or metalloids, the rehabilitation material for stabilization is added in an amount of 0.2 g/L to 3 g/L to the wastewater; in some embodiments, the rehabilitation is conducted at a temperature of 10° C. to 40° C. for 3 h to 24 h.

The functional material for synchronously stabilizing multiple metals and the preparation method thereof, and the method for rehabilitating soil or wastewater contaminated by heavy metals and/or metalloids according to the present disclosure will be described in detail in conjunction with the following examples, but they should not be construed as limiting the claimed scope of the present disclosure.

EXAMPLES

Example 1

A functional material for synchronously stabilizing multiple metals was prepared by the following method.

(1) A preparation process was conducted at room temperature according to the flowchart as shown in FIG. 1. FeSO$_4$·7H$_2$O, Fe$_2$(SO$_4$)$_3$, and MnSO$_4$·H$_2$O were mixed according to a molar ratio of Fe$^{2+}$, Fe$^{3+}$, and Mn$^{2+}$ of 1:3:3, and dissolved in water. White carbon black was then added thereto, in an amount of 15% of a sum of the masses of iron and manganese elements, and the resulting mixture was stirred to be uniform. A KH$_2$PO$_4$ solution was then added thereto, according to a molar ratio of Fe$^{2+}$, Fe$^{3+}$, Mn$^{2+}$, and PO$_4^{3-}$ of 1:3:3:3, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was then adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 2

A functional material for synchronously stabilizing multiple metals was prepared by the following method.

(1) A preparation process was conducted at room temperature according to the flowchart as shown in FIG. 1. FeSO$_4$·7H$_2$O, Fe$_2$(SO$_4$)$_3$, and MnSO$_4$·H$_2$O were mixed according to a molar ratio of Fe$^{2+}$, Fe$^{3+}$, and Mn$^{2+}$ of 1:5:5, and dissolved in water. White carbon black was then added thereto, in an amount of 15% of a sum of the masses of iron and manganese elements, and the resulting mixture was stirred to be uniform. A KH$_2$PO$_4$ solution was then added thereto according to a molar ratio of Fe$^{2+}$, Fe$^{3+}$, Mn$^{2+}$, and PO$_4^{3-}$ of 1:5:5:5, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 3

A functional material for synchronously stabilizing multiple metals was prepared by the following method.

(1) A preparation process was conducted at room temperature according to the flowchart as shown in FIG. 1.

$FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 3:1:3, and dissolved in water. White carbon black was then added thereto in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 3:1:3:5, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate, a pH value of the first reaction mixture was adjusted to 11 by using ammonia water (with a concentration of 25%). The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 4

A functional material for synchronously stabilizing multiple metals was prepared by the following method.

(1) A preparation process was conducted at room temperature according to the flowchart as shown in FIG. 1. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 3:3:5, and dissolved in water. White carbon black was then added thereto in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 3:3:5:1, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate, a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 5

A functional material for synchronously stabilizing multiple metals was prepared by the following method.

(1) A preparation process was conducted at room temperature according to the flowchart as shown in FIG. 1. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 1:1:1, and dissolved in water. White carbon black was then added thereto in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 1:1:1:1, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 6

A functional material for synchronously stabilizing multiple metals was prepared by the following method.

(1) A preparation process was conducted at room temperature according to the flowchart as shown in FIG. 1. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 3:5:1, and dissolved in water. White carbon black was then added thereto, in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 3:5:1:3, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 7

A functional material for synchronously stabilizing multiple metals was prepared by the following method.

(1) A preparation process was conducted at room temperature according to the flowchart as shown in FIG. 1. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 5:1:5, and dissolved in water. White carbon black was then added thereto, in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 5:1:5:3, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 8

A functional material for synchronously stabilizing multiple metals was prepared by the following method.

(1) A preparation process was conducted at room temperature according to the flowchart as shown in FIG. 1. $FeSO_4·7H_2O$, $Fe_2(SO_4)_3$, and $MnSO_4·H_2O$ were mixed according to a molar ratio of $Fe^{2+}$, $Fe^{3+}$, and $Mn^{2+}$ of 5:3:1, and dissolved in water. White carbon black was then added thereto, in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 5:3:1:5, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 9

A functional material for synchronously stabilizing multiple metals was prepared by the following method.

(1) A preparation process was conducted at room temperature according to the flowchart as shown in FIG. 1. $FeSO_4·7H_2O$, $Fe_2(SO_4)_3$, and $MnSO_4·H_2O$ were mixed according to a molar ratio of $Fe^{2+}$, $Fe^{3+}$, and $Mn^{2+}$ of 5:5:3, and dissolved in water. White carbon black was then added thereto, in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 5:5:3:1, followed by a continuous stirring with a stirrer at 300 r/min (i.e. undergoing the first precipitation reaction).

(2) After the first precipitation reaction in step (1) was conducted for 60 min (obtaining a first reaction mixture containing the phosphate), a pH value of the first reaction mixture was adjusted to 11 by adding ammonia water (with a concentration of 25%) thereto. The resulting mixture was further stirred for 60 min (i.e. undergoing a second precipitation reaction), obtaining a second reaction mixture. The second reaction mixture was filtered, obtaining a solid. The solid was washed with pure water repeatedly, and dried at 100° C., obtaining the functional material for synchronously stabilizing multiple metals.

Example 10

A functional material for synchronously stabilizing multiple metals was prepared by the following method.

(1) A preparation process was conducted at room temperature according to the flowchart as shown in FIG. 1. $FeSO_4·7H_2O$, $Fe_2(SO_4)_3$, and $MnSO_4·H_2O$ were mixed according to a molar ratio of $Fe^{2+}$, $Fe^{3+}$, and $Mn^{2+}$ of 1:3:3, and dissolved in water. White carbon black was then added thereto, in an amount of 10% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 1:3:3:3, followed by a continuous stirring with a stirrer at 300 r/min (i.e. undergoing the first precipitation reaction).

(2) After the first precipitation reaction in step (1) was conducted for 45 min (obtaining a first reaction mixture containing the phosphate), a pH value of the first reaction mixture was adjusted to 11 by adding ammonia water (with a concentration of 25%) thereto. The resulting mixture was further stirred for 45 min (i.e. undergoing a second precipitation reaction), obtaining a second reaction mixture. The second reaction mixture was filtered, obtaining a solid. The solid was washed with pure water repeatedly, and dried at 450° C., obtaining the functional material for synchronously stabilizing multiple metals.

Example 11

A functional material for synchronously stabilizing multiple metals was prepared by the following method.

(1) A preparation process was conducted at room temperature according to the flowchart as shown in FIG. 1. $FeSO_4·7H_2O$, $Fe_2(SO_4)_3$, and $MnSO_4·H_2O$ were mixed according to a molar ratio of $Fe^{2+}$, $Fe^{3+}$, and $Mn^{2+}$ of 1:3:3, and dissolved in water. White carbon black was then added thereto, in an amount of 25% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 1:3:3:3, followed by a continuous stirring with a stirrer at 300 r/min (i.e. undergoing the first precipitation reaction).

(2) After the first precipitation reaction in step (1) was conducted for 120 min (obtaining a first reaction mixture containing the phosphate), a pH value of the first reaction mixture was adjusted to 10 by adding ammonia water (with a concentration of 25%) thereto. The resulting mixture was further stirred for 120 min (i.e. undergoing a second precipitation reaction), obtaining a second reaction mixture. The second reaction mixture was filtered, obtaining a solid. The solid was washed with pure water repeatedly, and dried at 300° C., obtaining the functional material for synchronously stabilizing multiple metals.

Example 12

A functional material for synchronously stabilizing multiple metals was prepared by the following method.

(1) A preparation process was conducted at room temperature according to the flowchart as shown in FIG. 1. $FeSO_4·7H_2O$, $Fe_2(SO_4)_3$, and $MnSO_4·H_2O$ were mixed according to a molar ratio of $Fe^{2+}$, $Fe^{3+}$, and $Mn^{2+}$ of 1:3:3, and dissolved in water. Kaolin was then added thereto, in an amount of 15% of a sum of the masses of iron and manganese elements, and the resulting mixture was stirred to be uniform. A $KH_2PO_4$ solution was then added thereto according to a molar ratio of $Fe^{2+}$, $Fe^{3+}$, $Mn^{2+}$, and $PO_4^{3-}$ of 1:3:3:3, followed by a continuously stirring with a stirrer at 300 r/min (i.e. undergoing the first precipitation reaction).

(2) After the first precipitation reaction in step (1) was conducted for 120 min (obtaining a first reaction mixture containing the phosphate), a pH value of the first reaction mixture was adjusted to 10 by adding ammonia water (with a concentration of 25%) thereto. The resulting mixture was further stirred for 120 min (i.e. undergoing a second precipitation reaction), obtaining a second reaction mixture.

The second reaction mixture was filtered, obtaining a solid. he solid was washed with pure water repeatedly, and dried at 100° C., obtaining the functional material for synchronously stabilizing multiple metals.

Comparative Example 1

This example was performed as described in Example 1, except that no dispersing material was added during the preparation process.

Comparative Example 2

A functional material for synchronously stabilizing multiple metals was prepared by the following method.

A preparation process was conducted at room temperature. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ at 1:3:3, and dissolved in water. White carbon black was then added thereto, in an amount of 15% of a sum of the masses of iron and manganese elements, and the resulting mixture was stirred to be uniform. A $KH_2PO_4$ solution (excess) was then added thereto, followed by a continuous stirring with a stirrer at 300 r/min (i.e. undergoing a reaction). After the reaction was conducted for 60 min, obtaining a reaction mixture. The reaction mixture was filtered, obtaining a solid. The solid was washed with pure water, and dried at 100° C., obtaining the functional material for synchronously stabilizing multiple metals.

Comparative Example 3

A functional material for synchronously stabilizing multiple metals was prepared according to the following method.

A preparation process was conducted at room temperature. $FeSO_4 \cdot 7H_2O$, $Fe_2(SO_4)_3$, and $MnSO_4 \cdot H_2O$ were mixed according to a molar ratio of $Fe^{2+}$, $Fe^{3+}$, and $Mn^{2+}$ of 1:3:3, and dissolved in water. White carbon black was then added thereto, in an amount of 15% of a sum of the masses of iron and manganese elements, and the resulting mixture was stirred to be uniform. A pH value of the resulting mixture was adjusted to 11 by adding ammonia water (with a concentration of 25%). The resulting mixture was further stirred for 120 min (i.e. undergoing a reaction), obtaining a reaction mixture. The reaction mixture was filtered, obtaining a solid. The solid was washed with pure water repeatedly, and dried at 100° C., obtaining the functional material for synchronously stabilizing multiple metals.

Figure 2:
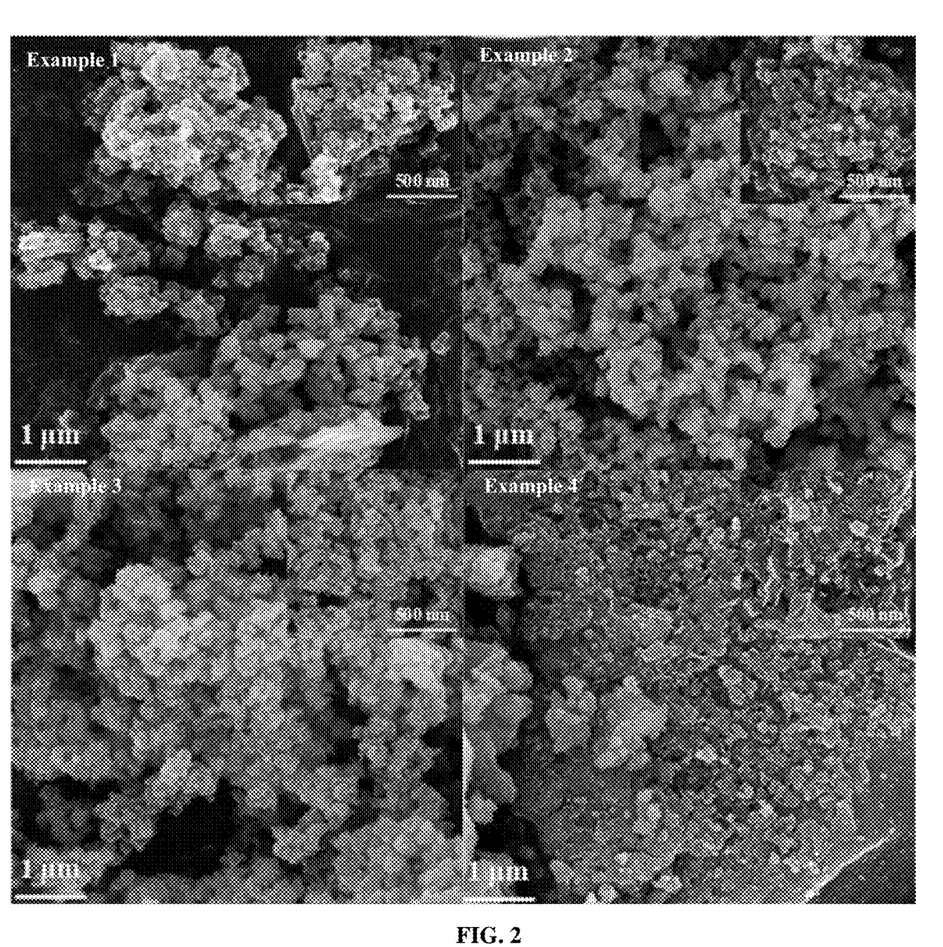
FIG. 2 shows scanning electron microscope (SEM) images of functional materials for synchronously stabilizing multiple metals prepared in Examples 1 to 4.

Structural Characterization of the Functional Materials for Synchronously Stabilizing Multiple Metals Obtained in Examples FIG. 2 shows scanning electron microscope (SEM) images of functional materials for synchronously stabilizing multiple metals prepared in Examples 1 to 4. It can be seen that a surface of the functional material for synchronously stabilizing multiple metals prepared in the example is loose and porous.

Figure 3:
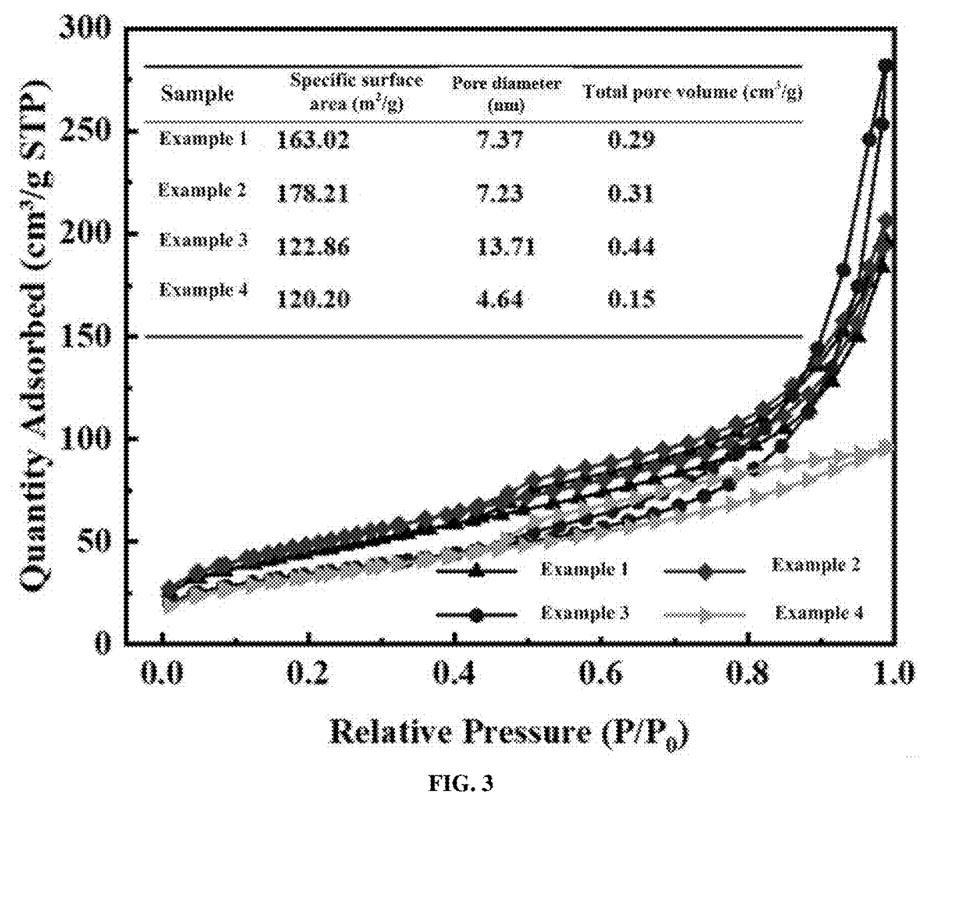
FIG. 3 shows $N_2$ adsorption-desorption isotherms of the functional materials for synchronously stabilizing multiple metals prepared in Examples 1 to 4.

FIG. 3 shows $N_2$ adsorption/desorption isotherms of the functional materials for synchronously stabilizing multiple metals prepared in Examples 1 to 4. The functional materials for synchronously stabilizing multiple metals prepared in Examples have a relatively larger specific surface area: the functional material prepared in Example 1 has a specific surface area of 163.02 $m^2/g$, a pore diameter of 7.37 nm, and a total pore volume of 0.29 $cm^3/g$; the functional material prepared in Example 2 has a specific surface area of 178.21 $m^2/g$, a pore diameter of 7.23 nm, and a total pore volume of 0.31 $cm^3/g$; the functional material prepared in Example 3 has a specific surface area of 122.86 $m^2/g$, a pore diameter of 13.71 nm, and a total pore volume of 0.44 $cm^3/g$; the functional material prepared in Example 4 has a specific surface area of 120.20 $m^2/g$, a pore diameter of 4.64 nm, and a total pore volume of 0.15 $cm^3/g$.

Figure 4:
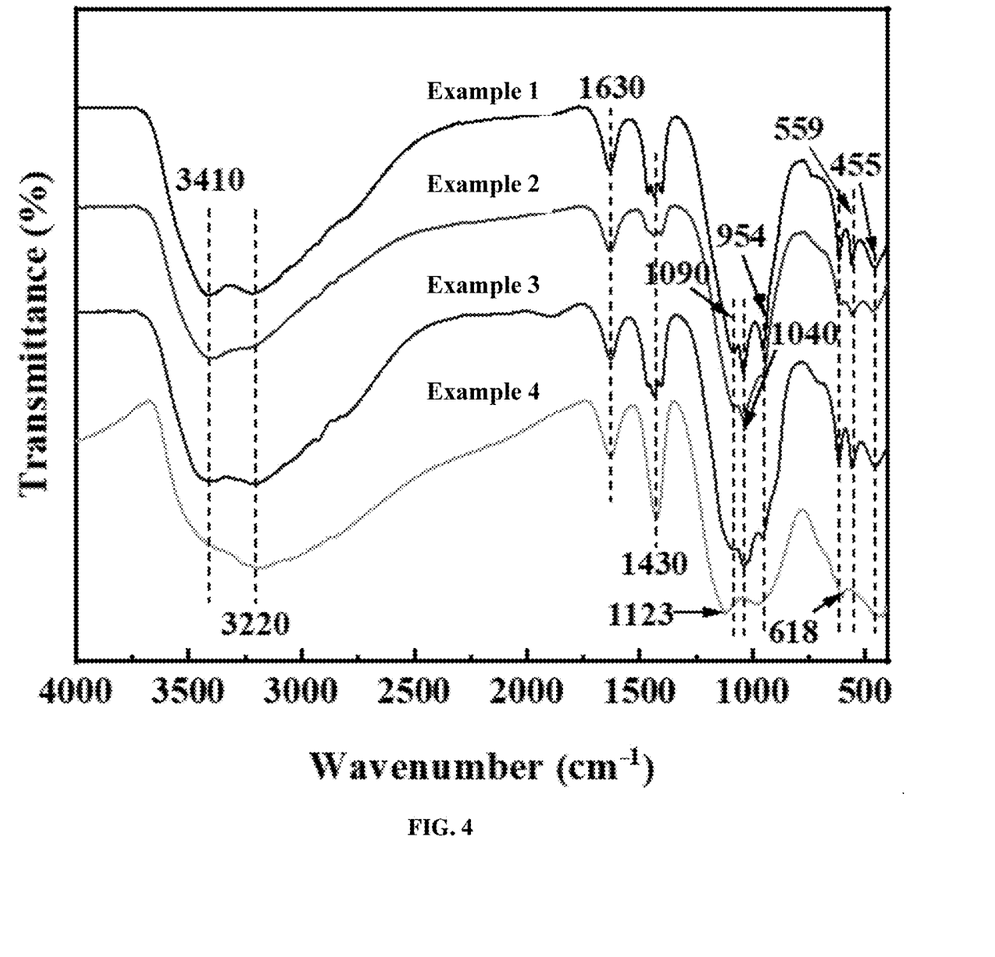
FIG. 4 shows infrared spectrum diagrams of the functional materials for synchronously stabilizing multiple metals prepared in Examples 1 to 4.

FIG. 4 shows infrared spectrum diagrams of the functional materials for synchronously stabilizing multiple metals prepared in Examples 1 to 4. Infrared spectral analysis shows that, the functional materials for synchronously stabilizing multiple metals prepared in Examples include abundant functional groups on the surface, such as —OH, M—O, M—OH (M representing Fe and Mn), and $PO_4^{3-}$ groups.

The functional materials for synchronously stabilizing multiple metals prepared in other Examples were characterized. The functional materials for synchronously stabilizing multiple metals prepared in other Examples also have loose and porous surfaces and are rich in functional groups, with a pore diameter of 4 nm to 15 nm, a specific surface area of 110 $m^2/g$ to 190 $m^2/g$, and a total pore volume of 0.14 $cm^3/g$ to 0.44 $cm^3/g$.

Performance Testing of the Functional Materials for Synchronously Stabilizing Multiple Metals Obtained in Examples and Comparative Examples Performance Testing 1

Test soil 1 was taken from contaminated soil of a farmland around an antimony mining area somewhere in Hunan province, China. Test soil 2 was taken from contaminated soil around a lead-zinc mining area somewhere in Hunan province, China. The test soils 1 and 2 were naturally air-dried, followed by removing stones and plant residues, and passing through a 16-mesh sieve for later use.

The rehabilitation materials obtained in Examples 1 to 12 and Comparative Examples 1 to 3 were added to the above two contaminated soils in an amount of 2% of the mass of the contaminated soils, respectively, and mixed to be uniform, and a soil moisture content was kept at about 40%, and a curing temperature was 30° C. In addition, experiments without the rehabilitation materials was performed as a blank control. After curing for 20 days, available contents of heavy metals (metalloids) was determined (in which an extractant for available Cd, Pb, Cu, Zn, Ni, and Cr was a DTPA-$CaCl_2$-TEA (HJ 804-2016) solution; and an extractant for available As and Sb was a 0.5 mol/L $NaHCO_3$ solution). The results of available contents of heavy metals (metalloids) before and after rehabilitation are shown in Table 1 and Table 2.

TABLE 1

Rehabilitation results of contaminated soil of farmland around antimony mining area

| Available metals (metalloids) (mg/kg) | | Sb | As | Cu | Zn | Pb | Ni | Cr |
|---|---|---|---|---|---|---|---|---|
| Before rehabilitation | | 22.74 | 5.92 | 19.85 | 24.36 | 7.25 | 4.62 | 1.49 |
| After rehabilitation | Blank control | 23.09 | 5.75 | 19.94 | 23.68 | 7.21 | 4.47 | 1.61 |
| | Example 1 | 5.64 | 1.29 | 1.74 | 1.88 | 0.19 | 0.63 | 0.34 |
| | Example 2 | 5.12 | 1.44 | 1.96 | 1.31 | 0.23 | 0.57 | 0.49 |
| | Example 3 | 6.05 | 1.03 | 2.62 | 1.75 | 0.35 | 0.69 | 0.27 |
| | Example 4 | 2.32 | 0.81 | 4.95 | 4.27 | 1.29 | 1.55 | 0.14 |
| | Example 5 | 5.86 | 1.35 | 3.35 | 3.94 | 1.05 | 0.91 | 0.89 |
| | Example 6 | 7.67 | 1.69 | 4.14 | 3.66 | 0.95 | 1.31 | 0.83 |
| | Example 7 | 5.21 | 0.87 | 4.31 | 2.39 | 0.72 | 0.97 | 0.37 |
| | Example 8 | 15.39 | 3.24 | 14.68 | 20.19 | 2.84 | 2.71 | 1.06 |
| | Example 9 | 3.06 | 1.35 | 6.62 | 8.57 | 1.06 | 0.47 | 0.35 |
| | Example 10 | 2.23 | 0.57 | 5.32 | 3.21 | 2.61 | 0.68 | 0.26 |
| | Example 11 | 6.54 | 2.35 | 4.62 | 5.89 | 0.94 | 1.35 | 0.63 |
| | Example 12 | 6.29 | 2.61 | 7.83 | 7.06 | 0.56 | 0.79 | 0.64 |
| | Comparative Example 1 | 7.03 | 1.84 | 2.02 | 2.30 | 0.17 | 0.59 | 0.52 |
| | Comparative Example 2 | 18.62 | 5.09 | 1.74 | 1.89 | 0.26 | 0.34 | 0.91 |
| | Comparative Example 3 | 0.96 | 0.43 | 17.80 | 21.03 | 6.69 | 4.05 | 0.56 |

TABLE 2

Rehabilitation results of contaminated soil around lead-zinc mining area

| Available metals (metalloids) (mg/L) | | Cd | Pb | Cu | Zn | Sb | As |
|---|---|---|---|---|---|---|---|
| Before rehabilitation | | 4.76 | 57.78 | 3.82 | 54.73 | 0.89 | 0.67 |
| After rehabilitation | Blank control | 4.59 | 58.23 | 3.64 | 53.10 | 0.95 | 0.62 |
| | Example 1 | 0.15 | 1.32 | 0.13 | 3.94 | 0.34 | 0.16 |
| | Example 2 | 0.10 | 1.07 | 0.20 | 4.86 | 0.42 | 0.21 |
| | Example 3 | 0.12 | 1.54 | 0.72 | 3.62 | 0.35 | 0.29 |
| | Example 4 | 0.53 | 5.37 | 0.59 | 19.46 | 0.43 | 0.09 |
| | Example 5 | 1.17 | 2.61 | 0.52 | 26.97 | 0.24 | 0.34 |
| | Example 6 | 1.01 | 3.95 | 1.23 | 22.19 | 0.04 | 0.19 |
| | Example 7 | 1.04 | 5.69 | 0.47 | 17.68 | 0.046 | 0.15 |
| | Example 8 | 2.71 | 23.94 | 2.36 | 47.66 | 0.090 | 0.46 |
| | Example 9 | 2.33 | 19.78 | 1.01 | 36.61 | 0.26 | 0.32 |
| | Example 10 | 1.83 | 29.19 | 1.69 | 26.37 | 0.12 | 0.12 |
| | Example 11 | 1.04 | 12.62 | 1.32 | 15.98 | 0.28 | 0.19 |
| | Example 12 | 0.92 | 10.84 | 1.68 | 8.34 | 0.52 | 0.37 |
| | Comparative Example 1 | 0.47 | 1.12 | 0.23 | 3.05 | 0.38 | 0.29 |
| | Comparative Example 2 | 0.39 | 0.98 | 0.31 | 2.66 | 0.76 | 0.46 |
| | Comparative Example 3 | 3.80 | 49.71 | 3.43 | 46.57 | 0.17 | 0.10 |

Performance Testing 2

A mixed solution of multiple heavy metals (metalloids) was prepared, and a concentration of each heavy metal (metalloid) was adjusted to 25 mg/L, and a pH value of the mixed solution was set to 5.0 to simulate wastewater contaminated by heavy metals (metalloids). The rehabilitation materials obtained in Examples 1 to 12 and Comparative Examples 1 to 3 were added thereto, in an amount of 1 g/L respectively. The resulting mixture was then continuously shaken for 12 h at 25° C. and then filtered. The concentrations of heavy metals (metalloids) in a filtrate was determined by using an ICP-AES inductively coupled atomic emission spectrometer. The results of contents of heavy metals (metalloids) in the wastewater before and after the rehabilitation are shown in Table 3.

TABLE 3

Contents of heavy metals (metalloids) in wastewater before and after rehabilitation

| Heavy metals (metalloids) content (mg/L) | | Cd | Pb | Cu | Zn | Sb (III) | As (III) | Ni | Cr (VI) |
|---|---|---|---|---|---|---|---|---|---|
| Before rehabilitation | | 25.00 | 25.00 | 25.00 | 25.00 | 25.00 | 25.00 | 25.00 | 25.00 |
| After rehabilitation | Example 1 | less than 0.06 | less than 0.03 | 0.25 | 0.32 | 3.87 | 9.60 | 4.32 | 8.85 |

TABLE 3-continued

Contents of heavy metals (metalloids) in wastewater before and after rehabilitation

| Heavy metals (metalloids) content (mg/L) | Cd | Pb | Cu | Zn | Sb (III) | As (III) | Ni | Cr (VI) |
|---|---|---|---|---|---|---|---|---|
| Example 2 | 0.14 | less than 0.02 | 0.17 | 0.29 | 4.53 | 7.53 | 3.22 | 10.38 |
| Example 3 | less than 0.05 | less than 0.06 | 1.64 | less than 0.05 | 3.36 | 12.27 | 0.87 | 7.21 |
| Example 4 | 2.26 | less than 0.06 | 1.17 | 5.61 | 1.14 | 2.55 | 4.12 | 3.67 |
| Example 5 | 4.98 | less than 0.06 | 2.38 | 3.71 | 2.69 | 7.32 | 5.07 | 7.35 |
| Example 6 | 2.90 | 0.13 | 6.94 | 5.53 | 0.98 | 2.69 | 4.95 | 7.27 |
| Example 7 | 2.58 | 0.27 | 3.65 | 4.51 | 1.98 | 17.45 | 14.80 | 16.62 |
| Example 8 | 7.72 | 3.59 | 17.88 | 20.35 | 18.54 | 19.63 | 15.07 | 18.74 |
| Example 9 | 4.83 | 2.09 | 14.32 | 11.76 | 2.60 | 7.84 | 10.91 | 6.39 |
| Example 10 | 0.35 | 0.12 | 3.76 | 5.51 | 0.98 | 2.06 | 5.68 | 7.34 |
| Example 11 | 0.19 | 0.23 | 1.25 | 1.59 | 2.74 | 1.78 | 3.05 | 4.17 |
| Example 12 | 0.14 | less than 0.03 | 0.73 | 0.91 | 4.56 | 10.63 | 5.68 | 7.07 |
| Comparative Example 1 | less than 0.06 | less than 0.03 | 0.17 | 0.39 | 4.85 | 13.63 | 15.47 | 14.69 |
| Comparative Example 2 | less than 0.04 | less than 0.05 | 0.11 | 0.28 | 17.92 | 20.88 | 0.54 | 17.35 |
| Comparative Example 3 | 20.46 | 17.81 | 21.09 | 20.15 | 1.04 | 1.66 | 20.73 | 10.52 |

From Table 1, Table 2 and Table 3, it can be seen that the functional material for synchronously stabilizing multiple metals prepared by the present disclosure could simultaneously rehabilitate the soil and water contaminated by Cd, Pb, Cu, Zn, Ni, Cr, As, and Sb, and significantly reduce available concentrations of heavy metals (metalloids) in soil and concentrations of heavy metals (metalloids) in wastewater after rehabilitation. In addition, for soil and water of different contamination types, the ratio of $Fe^{2+}$, $Fe^{3+}$, $Mn^{2+}$ and $PO_4^{3-}$ could be adjusted according to the methods of Examples 1 to 9. Phosphate compounds tend to stabilize Cd, Pb, Cu, Zn, Ni, and Cr, and the iron-manganese oxide and/or iron-manganese hydroxide tend to stabilize As and Sb, thereby achieving the rehabilitation of different types of soil or water contaminated by heavy metals (metalloids) to the greatest extent. Furthermore, it can be seen from Examples and Comparative Examples that, adding an appropriate amount of the dispersing material could promote a stabilization effect of the rehabilitation material on heavy metals (metalloids) in contaminated soil and water to a certain extent.

The above descriptions are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A functional material for synchronously stabilizing multiple metals, comprising a phosphate compound, an iron-manganese oxide, and an iron-manganese hydroxide, wherein the functional material for synchronously stabilizing multiple metals has a pore diameter of 4 nm to 15 nm, a specific surface area of 110 $m^2$/g to 190 $m^2$/g, and a total pore volume of 0.14 $cm^3$/g to 0.44 $cm^3$/g, and
wherein the functional material for synchronously stabilizing multiple metals is prepared by a method comprising
(1) mixing a ferrous salt, a ferric salt, a manganous salt, water, a dispersing material, and a phosphate to obtain a first mixture, and subjecting the first mixture to a first precipitation reaction to obtain a first reaction mixture containing the phosphate, wherein a sum of a molar amount of iron element in the ferrous salt and the ferric salt, and manganese element in the manganous salt is stoichiometrically in excess relative to a molar amount of the phosphate;
(2) adjusting a pH value of the first reaction mixture containing the phosphate to 10-12 by adding an alkali thereto to obtain a second mixture, and subjecting the second mixture to a second precipitation reaction to obtain a second reaction mixture; and
(3) subjecting the second reaction mixture to a solid-liquid separation to obtain a solid, washing the solid, and drying to obtain the functional material for synchronously stabilizing multiple metals.

2. The functional material as claimed in claim 1, wherein in step (1), mixing the ferrous salt, the ferric salt, the manganous salt, water, the dispersing material, and the phosphate comprises steps of
mixing the ferrous salt, the ferric salt, the manganous salt, and water to obtain an aqueous salt solution;
adding the dispersing material to the aqueous salt solution and mixing to obtain a mixed dispersion; and
adding the phosphate to the mixed dispersion.

3. The functional material as claimed in claim 1, wherein in step (1), the ferrous salt is at least one selected from the group consisting of $FeSO_4$, $FeSO_4 \cdot 7H_2O$, $FeCl_2$, and $Fe(NH_4)_2(SO_4)_2 \cdot 6H_2O$; the ferric salt is at least one selected from the group consisting of $Fe_2(SO_4)_3 \cdot xH_2O$, $FeCl_3$, and $NH_4Fe(SO_4)_2$; the manganous salt is at least one selected from the group consisting of $MnSO_4$, $MnSO_4 \cdot H_2O$, and $MnCl_2 \cdot 6H_2O$; and the phosphate is at least one selected from the group consisting of $NH_4H_2PO_4$, $(NH_4)_2HPO_4$, $NaH_2PO_4$, $Na_2HPO_4$, $KH_2PO_4$, and $K_2HPO_4$.

4. The functional material as claimed in claim 1, wherein in step (1), a ratio of a sum of a molar amount of $Fe^{2+}$ in the ferrous salt, $Fe^{3+}$ in the ferric salt and $Mn^{2+}$ in the manganous salt to a molar amount of $PO_4^{3-}$ in the phosphate is in the range of (1.4-13):1; and a molar ratio of $Fe^{2+}$, $Fe^{3+}$ and $Mn^{2+}$ is in the range of (1-5):(1-5):(1-5).

5. The functional material as claimed in claim 1, wherein in step (1), the dispersing material is at least one selected from the group consisting of kaolin, rectorite, attapulgite, sepiolite, and white carbon black; and
a mass of the dispersing material is 10% to 25% of a sum of masses of iron element in the ferrous salt and the ferric salt, and manganese element in the manganous salt.

6. The functional material as claimed in claim 1, wherein the first precipitation reaction and the second precipitation reaction each are independently conducted for 30 min to 120 min; and
both of the first precipitation reaction and the second precipitation reaction are conducted with stirring, each independently at a stirring speed of 200 r/min to 500 r/min.

7. The functional material as claimed in claim 1, wherein in step (3), the drying is conducted at a temperature of 60° C. to 450° C.

8. A method for rehabilitating soil or wastewater contaminated by heavy metals and/or metalloids, comprising steps of
mixing the soil or wastewater contaminated by heavy metals and/or metalloids with a rehabilitation material for stabilization, and conducting rehabilitation, wherein the heavy metals and/or metalloids comprise at least one selected from the group consisting of Cd, Pb, Cu, Zn, Ni, Cr, As, and Sb; and
the rehabilitation material for stabilization is the functional material for synchronously stabilizing multiple metals as claimed in claim 1.

9. The method as claimed in claim 8, wherein under the condition of rehabilitating the soil contaminated by heavy metals and/or metalloids, a mass of the rehabilitation material for stabilization is 0.1% to 3% of a mass of the soil, and the rehabilitation is conducted at a temperature of 10° C. to 40° C. for 10 days to 35 days; and
under the condition of rehabilitating the wastewater contaminated by heavy metals and/or metalloids, the rehabilitation material for stabilization is added to the wastewater in an amount of 0.2 g/L to 3 g/L, and the rehabilitation is conducted at a temperature of 10° C. to 40° C. for 3 h to 24 h.

10. A method for preparing a functional material for synchronously stabilizing multiple metals, comprising steps of
(1) mixing a ferrous salt, a ferric salt, a manganous salt, water, a dispersing material, and a phosphate to obtain a first mixture, and subjecting the first mixture to a first precipitation reaction to obtain a first reaction mixture containing the phosphate, wherein a sum of a molar amount of iron element in the ferrous salt and the ferric salt, and manganese element in the manganous salt is stoichiometrically in excess relative to a molar amount of the phosphate;
(2) adjusting a pH value of the first reaction mixture containing the phosphate to 10-12 by adding an alkali thereto to obtain a second mixture, and subjecting the second mixture to a second precipitation reaction to obtain a second reaction mixture; and
(3) subjecting the second reaction mixture to a solid-liquid separation to obtain a solid, washing the solid, and drying to obtain the functional material for synchronously stabilizing multiple metals.

11. The method as claimed in claim 10, wherein in step (1), mixing the ferrous salt, the ferric salt, the manganous salt, water, the dispersing material, and the phosphate comprises steps of
mixing the ferrous salt, the ferric salt, the manganous salt, and water to obtain an aqueous salt solution;
adding the dispersing material to the aqueous salt solution and mixing to obtain a mixed dispersion; and
adding the phosphate to the mixed dispersion.

12. The method as claimed in claim 11, wherein in step (1), the ferrous salt is at least one selected from the group consisting of $FeSO_4$, $FeSO_4 \cdot 7H_2O$, $FeCl_2$, and $Fe(NH_4)_2(SO_4)_2 \cdot 6H_2O$; the ferric salt is at least one selected from the group consisting of $Fe_2(SO_4)_3 \cdot xH_2O$, $FeCl_3$, and $NH_4Fe(SO_4)_2$; the manganous salt is at least one selected from the group consisting of $MnSO_4$, $MnSO_4 \cdot H_2O$, and $MnCl_2 \cdot 6H2O$; and the phosphate is at least one selected from the group consisting of $NH_4H_2PO_4$, $(NH_4)_2HPO_4$, $NaH_2PO_4$, $Na_2HPO_4$, $KH_2PO_4$, and $K_2HPO_4$.

13. The method as claimed in claim 11, wherein in step (1), a ratio of a sum of a molar amount of $Fe^{2+}$ in the ferrous salt, $Fe^{3+}$ in the ferric salt and $Mn^{2+}$ in the manganous salt to a molar amount of $PO_4^{3-}$ in the phosphate is in the range of (1.4-13):1; and a molar ratio of $Fe^{2+}$, $Fe^{3+}$ and $Mn^{2+}$ is in the range of (1-5):(1-5):(1-5).

14. The method as claimed in claim 11, wherein in step (1), the dispersing material is at least one selected from the group consisting of kaolin, rectorite, attapulgite, sepiolite, and white carbon black; and
a mass of the dispersing material is 10% to 25% of a sum of masses of iron element in the ferrous salt and the ferric salt, and manganese element in the manganous salt.

15. The method as claimed in claim 10, wherein in step (1), the ferrous salt is at least one selected from the group consisting of $FeSO_4$, $FeSO_4 \cdot 7H_2O$, $FeCl_2$, and $Fe(NH_4)_2(SO_4)_2 \cdot 6H_2O$; the ferric salt is at least one selected from the group consisting of $Fe_2(SO_4)_3 \cdot xH_2O$, $FeCl_3$, and $NH_4Fe(SO_4)_2$; the manganous salt is at least one selected from the group consisting of $MnSO_4$, $MnSO_4 \cdot H_2O$, and $MnCl_2 \cdot 6H_2O$; and the phosphate is at least one selected from the group consisting of $NH_4H_2PO_4$, $(NH_4)_2HPO_4$, $NaH_2PO_4$, $Na_2HPO_4$, $KH_2PO_4$, and $K_2HPO_4$.

16. The method as claimed in claim 10, wherein in step (1), a ratio of a sum of a molar amount of $Fe^{2+}$ in the ferrous salt, $Fe^{3+}$ in the ferric salt and $Mn^{2+}$ in the manganous salt to a molar amount of $PO_4^{3-}$ in the phosphate is in the range of (1.4-13):1; and a molar ratio of $Fe^{2+}$, $Fe^{3+}$ and $Mn^{2+}$ is in the range of (1-5):(1-5):(1-5).

17. The method as claimed in claim 10, wherein in step (1), the dispersing material is at least one selected from the group consisting of kaolin, rectorite, attapulgite, sepiolite, and white carbon black; and a mass of the dispersing material is 10% to 25% of a sum of masses of iron element in the ferrous salt and the ferric salt, and manganese element in the manganous salt.

18. The method as claimed in claim 10, wherein the first precipitation reaction and the second precipitation reaction each are independently conducted for 30 min to 120 min; and both of the first precipitation reaction and the second precipitation reaction are conducted with stirring, each independently at a stirring speed of 200 r/min to 500 r/min.

19. The method as claimed in claim 10, wherein in step (3), the drying is conducted at a temperature of 60° C. to 450° C.

* * * * *